Sept. 18, 1951     A. A. BOEHM, JR     2,567,921
DIELECTRIC TEST APPARATUS
Filed March 7, 1945
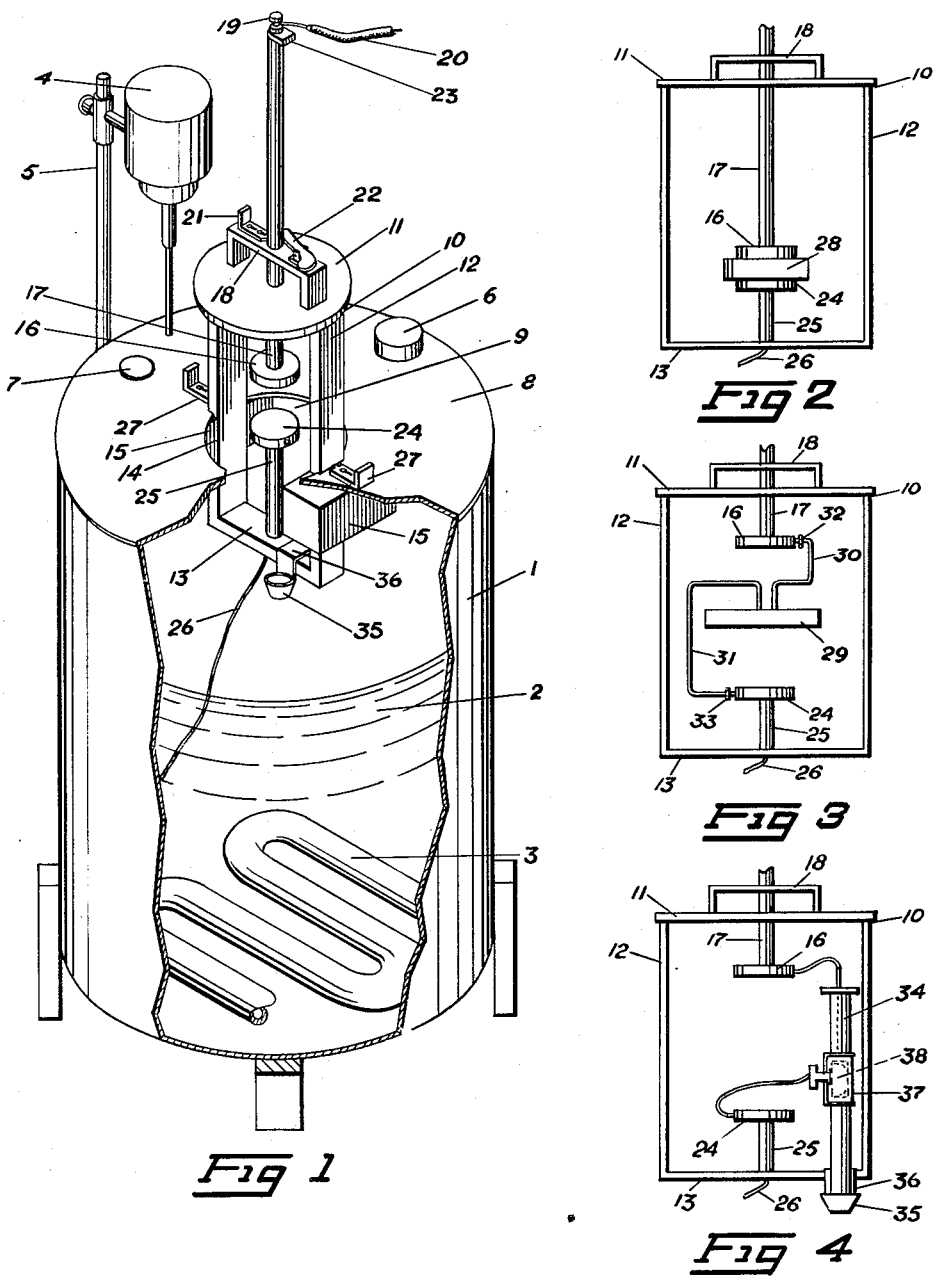
INVENTOR.
*Alfred A. Boehm Jr.*
BY
*Ralph L Chappell*
ATTORNEY Patented Sept. 18, 1951

2,567,921

UNITED STATES PATENT OFFICE 2,567,921

DIELECTRIC TEST APPARATUS

Alfred A. Boehm, Jr., New York, N. Y.

Application March 7, 1945, Serial No. 581,534

5 Claims. (Cl. 175—183)

(Granted under the act of March 3, 1883, as amended April 30, 1928; 370 O. G. 757)

This invention relates in general to dielectric-test apparatus and in particular to a sample-testing holder in combination with an oil-filled tank in which the sample holding means are movable into and out of the oil.

In the dielectric testing of phenolic insulating material, one prescribed test is to ascertain the dielectric breakdown point of a sample during immersion in oil. Insofar as I am aware, up until the time of my invention the apparatus used in this test consisted of an open vat containing a supply of oil and various jigs or sample holders each designed for a different type sample. The electrodes are connected to the sample which is dropped into the oil, and after breakdown occurs the sample and electrodes must be removed by hand, resulting in untidy dripping of oil. It has also been found that at the dielectric breakdown point the reaction is sometimes of sufficient violence to cause agitation of the oil and the breaking of the oil container. Another disadvantage of the open vat is the fact that the temperature of the oil is different to control and the temperature of the oil is difficult to control and the temperature constant in all tests is, not alike.

It is therefore, one object of my invention to provide in the dielectric testing of samples in an oil bath, a vat or tank adapted to be closed when the sample is being tested.

It is another object to provide, in dielectric-testing apparatus employing an oil-receiving tank, sample-holding means slidably supported by the tank and movable into and out of the oil.

It is a further object to provide a sample-holding means adapted to support and provide electrical connection to several sizes and shapes of samples.

Other objects and advantages will be apparent by reference to the following description in connection with the accompanying drawing in which:

Fig. 1 is a perspective view of my invention, parts being broken away to illustrate better certain other parts, Fig. 2 is a semi-diagrammatic view of a sample mount adapted for dielectric test through the thickness of the sample or parallel to the forming pressure, Fig. 3 is a similar view showing the electrodes set up for dielectric test perpendicular to the forming pressure, and Fig. 4 is a view similar to Figs. 2 and 3 with the electrodes arranged for the dielectric testing through the wall of tubing.

I designates a vat, tank or the like container for holding oil 2. Suitable heating elements 3 are provided for raising the temperature of the oil. A stirring motor 4 adjustably carried on standard 5 provides a means for agitating the oil to maintain it at an even temperature and to dissipate carbonized oil areas after a breakdown. A thermostat 6 may be provided for proper temperature control of the oil in the tank, and a thermometer 7 may be provided for indicating the temperature of the oil.

The tank 1 has a cover 8, provided with an opening 9 in which the sample holding jig 10 is adapted to operate as a carriage for transporting a sample of the material to be tested into and out of the container and the fluid contained therein. The sample holding jig comprises a cover plate 11 with opposite depending legs 12 connected at their lower ends by a crossbar 13, these being preferably constructed of electrical insulating material. The legs 12 are slidably supported in guideways comprising the grooves 14 of blocks 15 which are carried by the tank cover 8.

The lower electrode 24 is carried by rod 25 which is secured to crossbar 13 and has a lead 26 connected to the tank 1, which is grounded. Slidable dogs 27 are provided on the tank cover 8 and are adapted to engage the legs 12 to retain the sample holding jig 10 in raised position. The opening 9 thus provides a passage to transport the carriage 10 into and out of the container 1 to convey the sample alternatively into and out of the fluid 2. When the carriage 10 is in lowered position to thereby position the sample in the fluid 2, the cover plate 9 rests on the blocks 15 and closes the passage of opening 9.

The upper electrode 16 is secured to rod 17 which passes through cover 11 and guide 18. Rod 17 carries a terminal 19 to which lead 20, with a suitable power source, is connected.

By moving the rod 17 lengthwise of itself in guide 18, the electrode 16 is movable towards and away from the electrode 24, whereby the electrodes 16 and 24 are adjustably positionable relative to each other to engage and hold the sample. A dog 21 is slidably mounted on guide 18 and is adapted to engage rod 17 to hold it in raised position, and to secure the electrodes 16 and 24 in their relative positions of adjustment. A pivoted arm or thumb lift 22 is adapted to engage projection 23 of rod 17 when the rod is in lowered position, whereby an initial movement may be imparted to the rod 17 to raise it sufficiently to introduce a standard sample, which is ⅛" by 4.0" in diameter.

In Fig. 2 I have shown my device being used for testing the dielectric qualities of a phenolic insulating material with the sample 28 placed flat between the electrodes. To apply the sample 28 it is merely necessary to raise the sample holding jig 10, depress thumb lift 22 to raise the upper electrode 16, place the sample flat on the lower electrode 24 and permit electrode 16 to gravitate onto the sample 28. The dogs 27 are then released and the sample holding jig or carriage 10 is moved downwardly into the oil 2.

In Fig. 3 I have shown the sample arranged for dielectric test transverse to forming pressure or lengthwise of the sample 29. To accomplish this I provide substantially rigid leads 30 and 31 which have banana type plugs 32 and 33 snugly fitting openings in electrodes 16 and 24. The other end of the leads 30 and 31 are tightly fitted in spaced openings in the sample 29. To insert the sample in the jig for this test the jig is dogged in raised position, the leads 30 and 31 are applied to the sample and to the electrodes, the sliding rod 17 permitting the electrode 16 to assume a suitable position, where it is locked by dog 21. The jig, with the sample assembled thereon, may now be lowered into the oil.

In Fig. 4 I have shown a method for the dielectric testing of a tubing sample 34. The crossbar 13 is provided with a tubing support 35 carried by strap 36 which is secured to the crossbar 13. The tubing support is in the form of an inverted truncated cone adapted to receive and center tubing samples of different diameters. An outer electrode 37 surrounds the tubing sample and is connected to electrode 24. An inner electrode 38 of substantially the same diameter as the inside diameter of the sample is inserted in the tube 34 and connects to electrode 16.

From the foregoing, it will be apparent that the construction and operation of my invention is relatively simple; that the sample is assembled to and removed from its holding jig in an expeditious manner and that various sizes and shapes of samples can be accommodated. It is also apparent that at the time the power is applied, the sample is completely immersed in the oil and the tank in which the oil and sample is contained is fully enclosed, thereby eliminating any danger of injury to the operator or damage to the apparatus if a violent reaction occurs.

Tests may be more rapidly performed and conditions of the testing will be more uniform than is possible with present apparatus.

It is to be understood that various modifications and changes may be made in this invention without departing from the spirit and scope thereof as set forth in the appended claims.

The invention described herein may be manufactured and used by or for the Government of the United States of America for governmental purposes without the payment of any royalties thereon or therefor.

What I claim is:

1. In a dielectric-testing device of the class described, a tank for containing an electrically insulating liquid, an opening in the top of the tank, guideways extending through the opening from the exterior to the interior of the tank, a sample holder supported by the guideways for movement along them, electrodes at the top and bottom of the sample holder, electrical connectors to the respective electrodes for providing a potential differential between them, the bottom electrode being fixed, the top electrode being movable in the top of the sample holder towards and away from the bottom electrode, means for locking the top electrode in raised position relative to the bottom electrode and means for locking the sample holder in raised position along the guideways exteriorly of the tank, the sample holder comprising a cover that closes the opening of the tank when the sample holder is in lowered position within the tank.

2. Apparatus comprising a fluid container, a passage communicating between the exterior and interior of the container, a carriage, a sample holder embodied in the carriage and comprising electrodes positionable to engage and hold the sample, guideways in the passage to transport the carriage into and out of the container to convey the sample holder alternatively into and out of the fluid, the carriage comprising a cover positioned to close the passage when the sample holder is positioned in the fluid.

3. Apparatus comprising a fluid container, a passage communicating between the exterior and interior of the container, a carriage, a sample holder embodied in the carriage and comprising electrodes adjustably positionable on the carriage relative to each other into and out of position to engage and hold the sample, a guideway in the passage to transport the carriage into and out of the container to convey the sample holder alternatively into and out of the fluid, the carriage comprising a cover positioned to close the passage when the sample holder is positioned n the liquid.

4. In apparatus as defined in claim 2, a dog operable to latch the carriage in the position it occupies along the guideways.

5. In apparatus as defined in claim 2, a dog operable to latch the carriage in the position it occupies along the guideways, and a dog operable to hold the electrodes in their relative positions of adjustment.

ALFRED A. BOEHM, Jr.

REFERENCES CITED

The following references are of record in the file of this patent:

UNITED STATES PATENTS

| Number | Name | Date |
|---|---|---|
| 424,894 | Murphey | Apr. 1, 1890 |
| 453,163 | Ries | May 26, 1891 |
| 1,467,461 | Vogel | Sept. 11, 1923 |
| 1,561,483 | Pickard | Nov. 17, 1925 |
| 2,104,456 | Friedman | Jan. 4, 1938 |
| 2,123,812 | Stevens et al. | July 12, 1938 |
| 2,217,733 | De Forest | Oct. 15, 1940 |
| 2,358,462 | Mahren | Sept. 19, 1944 |
| 2,374,535 | Gibson | Apr. 24, 1945 |

FOREIGN PATENTS

| Number | Country | Date |
|---|---|---|
| 447,753 | Germany | Aug. 1, 1927 |
| 312,241 | Great Britain | July 17, 1930 |